(12) United States Patent
Amatsuchi et al.

(10) Patent No.: US 7,528,548 B2
(45) Date of Patent: May 5, 2009

(54) PLASMA DISPLAY PANEL

(75) Inventors: Mario Amatsuchi, Yamanashi (JP);
Atsushi Hirota, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 444 days.

(21) Appl. No.: 11/401,285

(22) Filed: Apr. 11, 2006

(65) Prior Publication Data

US 2006/0226760 A1 Oct. 12, 2006

(30) Foreign Application Priority Data

Apr. 12, 2005 (JP) ............................. 2005-114670

(51) Int. Cl.
*H01J 17/49* (2006.01)
(52) U.S. Cl. ...................... 313/587; 313/586
(58) Field of Classification Search .......... 313/581–587
See application file for complete search history.

(56) References Cited

U.S. PATENT DOCUMENTS

| | | | | |
|---|---|---|---|---|
| 5,818,168 | A * | 10/1998 | Ushifusa et al. | 313/582 |
| 6,674,238 | B2 * | 1/2004 | Otani et al. | 313/587 |
| 6,744,201 | B2 * | 6/2004 | Nakayama et al. | 313/582 |
| 6,995,512 | B2 * | 2/2006 | Otani | 313/587 |
| 7,102,287 | B2 * | 9/2006 | Nishitani et al. | 313/587 |
| 7,245,078 | B2 * | 7/2007 | Hasegawa et al. | 313/587 |
| 7,329,989 | B2 * | 2/2008 | Okumura et al. | 313/582 |
| 7,391,156 | B2 * | 6/2008 | Hasegawa et al. | 313/587 |
| 2004/0189550 | A1 * | 9/2004 | Otani | 345/60 |
| 2005/0206318 | A1 * | 9/2005 | Hirota et al. | 313/585 |

FOREIGN PATENT DOCUMENTS

| JP | 2002-150953 | * | 5/2002 |
|---|---|---|---|
| JP | 2003-342566 | | 12/2003 |

OTHER PUBLICATIONS

A. Nishida, A. Ueki, and H. Mashida, "Preparation and Properties of Magnesia Powder by Vapor Phase Oxidation Process" Journal Of The Society Of Materials Science, Japan, vol. 36, No. 410, pp. 1157-1161, Nov. 1987.

* cited by examiner

*Primary Examiner*—Ashok Patel
(74) *Attorney, Agent, or Firm*—McGinn IP Law Group, PLLC

(57) ABSTRACT

A crystalline magnesium oxide layer, including magnesium oxide crystals causing a cathode-luminescence emission having a peak within a wavelength range of 200 nm to 300 nm upon excitation by an electron beam, is provided between the front glass substrate and the back glass substrate, facing the discharge cells. The phosphor layer of any one of red, green and blue colors has a discharge timing adjusting function for giving rise to an approximate match between a timing of a discharge initiated in the green discharge cell and a timing of a discharge initiated in the red or blue discharge cell.

15 Claims, 12 Drawing Sheets

FIRST EMBODIMENT EXAMPLE

SECTION V-V

SECTION W-W

SINGLE CRYSTALLINE MgO OF CUBIC SINGLE-CRYSTAL STRUCTURE

SINGLE CRYSTALLINE MgO OF CUBIC POLYCRYSTAL STRUCTURE

235nm-PEAK-INTENSITIES vs. PARTICLE-DIAMETER IN MgO SINGLE CRYSTALS

CL FROM VAPOR-DEPOSITED MgO

FIG.14A

MEASURED VALUES OF CHROMATICITY COORDINATES (x,y)

WITH COATING

IN-PLANE DIFFERENCE   x : 0.0035   y : 0.0093

| p1(0.3049, 0.3136) | p2(0.3066, 0.3117) | p3(0.3071, 0.3124) |
|---|---|---|
| p4(0.3070, 0.3151) | p5(0.3065, 0.3067) | p6(0.3084, 0.3132) |
| p7(0.3057, 0.3159) | p8(0.3065, 0.3160) | p9(0.3083, 0.3137) |

FIG.14B

WITHOUT COATING

IN-PLANE DIFFERENCE   x : 0.0071   y : 0.0118

| p1(0.3068, 0.3137) | p2(0.3098, 0.3119) | p3(0.3123, 0.3103) |
|---|---|---|
| p4(0.3073, 0.3140) | p5(0.3109, 0.3056) | p6(0.3101, 0.3109) |
| p7(0.3070, 0.3145) | p8(0.3075, 0.3174) | p9(0.3139, 0.3085) |

FIG.15A

MEASURED VALUES OF BRIGHTNESS

WITH COATING

IN-PLANE DIFFERENCE OF BRIGHTNESS : 14.0

| p1(209.3) | p2(211.4) | p3(208.1) |
|---|---|---|
| p4(201.7) | p5(203.1) | p6(202.6) |
| p7(211.4) | p8(207.5) | p9(215.7) |

WITHOUT COATING

IN-PLANE DIFFERENCE OF BRIGHTNESS : 22.2

| p1(214.2) | p2(229.2) | p3(216.4) |
|---|---|---|
| p4(207.0) | p5(215.9) | p6(211.0) |
| p7(209.9) | p8(217.5) | p9(229.2) |

($cd/m^2$)

THIRD EMBODIMENT EXAMPLE (tG<tR, tG<tB)

PLASMA DISPLAY PANEL

BACKGROUND OF THE INVENTION

1. Field of the Invention

This invention relates to a structure for plasma display panels.

The present application claims priority from Japanese Application No. 2005-114670, the disclosure of which is incorporated herein by reference.

2. Description of the Related Art

In typical plasma display panels (hereinafter referred to as "PDP"), a pair of substrates is placed parallel to each other on either side of a discharge space. Row electrode pairs, a dielectric layer overlying the row electrode pairs and a protective layer overlying the dielectric layer are provided on the inner face of one of the substrates. On the inner face of the other substrate, column electrodes extend in a direction at right angles to the row electrode pairs and form discharge cells arrayed in matrix form and each corresponding to an intersection with the row electrode pair in the discharge space. The column electrodes are overlain by a column-electrode protective layer. Then, red, green and blue phosphor layers are provided for the respective discharge cells on the column-electrode protective layer.

The discharge space is filled with a discharge gas that includes xenon.

The PDP structured as described above initiates an address discharge selectively between the column electrode and one of the row electrode pair, and then initiates a sustaining discharge between, the row electrodes of the row electrode pair in the discharge cells in which the address discharge results in a deposition of a wall charge on a portion of the dielectric layer facing the discharge cell (i.e. in the light emission cells).

Thereupon, the sustaining discharge results in the generation of vacuum ultraviolet light from the xenon in the discharge gas, and the vacuum ultraviolet light excites the phosphor layers, so that the phosphor layers emit red, green and/or blue visible light so as to generate an image on the panel surface in accordance with a video signal.

Conventionally, as regards the phosphors provided in the PDP to emit visible light upon excitation by the vacuum ultraviolet light, $(Y, Gd)BO_3$:Eu is known as a phosphor emitting red light, $Zn_2SiO_4$:Mn is known as a phosphor emitting green light (hereinafter referred to as "green phosphor"), and $BaMgAl_{10}O_{17}$:Eu is known as a phosphor emitting blue light. In addition, $MgAl_2O_4$:Mn, and the like are also known as the green phosphor.

An example of PDPs structured as described above is disclosed in Japanese Unexamined Patent Publication 2003-342566.

The red, green and blue phosphors differ from color to color in the electrification property and the electrostatic capacitance.

For this reason, the conventional PDPs show variation in discharge strength in the red, green and blue discharge cells. For example, when a discharge is produced in all the discharge cells, red, green and blue, for light emission in order to display a white color, the clear display of a white color is difficult.

SUMMARY OF THE INVENTION

It is an object of the present invention to solve a problem associated with conventional color PDPs as described above.

To attain this object, the present invention provides a plasma display panel which is equipped with a front substrate and a back substrate placed opposite each other on either side of a discharge space, a plurality of row electrode pairs provided between the front and back substrates, and column electrodes extending in a direction at right angles to the row electrode pairs between the front and back substrates and forming unit light emission areas respectively corresponding to the intersections with the row electrode pairs in the discharge space. The unit light emission areas are divided into three types, red unit light emission areas in which red phosphor layers are formed, green unit light emission areas in which green phosphor layers are formed and blue unit light emission areas in which blue phosphor layers are formed, a discharge being initiated in each of the unit light emission areas by applying voltage between the row electrodes constituting each row electrode pair or between the column electrode and the row electrode. In the PDP of the present invention, a crystalline magnesium oxide layer, which includes magnesium oxide crystals causing a cathode-luminescence emission having a peak within a wavelength range of 200 nm to 300 nm upon excitation by an electron beam, is provided between the front substrate and the back substrate, facing the red unit light emission areas, the green unit light emission areas and the blue unit light emission areas. Any one of the phosphor layers of the red, green and blue colors has a discharge timing adjusting function for giving rise to an approximate match between a timing of a discharge initiated in the green unit light emission area and a timing of either a discharge initiated in the red unit light emission area or that initiated in the blue unit light emission area.

In an exemplified embodiment of such a PDP according to the present invention as described above, the PDP has, between the front glass substrate and the back glass substrate, row electrode pairs extending in the row direction and column electrodes extending in the column direction and forming discharge cells in the discharge space in positions corresponding to the intersections with the row electrode pairs. The PDP comprises a crystalline magnesium oxide layer which includes magnesium oxide crystals causing a cathode-luminescence emission having a peak within a wavelength range of 200 nm to 300 nm upon excitation by an electron beam. The crystalline magnesium oxide layer is provided on a portion of a dielectric layer facing at least the discharge cells. The dielectric layer overlies either the row electrode pairs or the column electrodes. In addition, the PDP has red, green and blue phosphor layers formed in the respective discharge cells, and processes are performed on the PDP, for example: the red phosphor particles forming the phosphor layer in each of the red discharge cells are given either a deposition or a coating of a silicon dioxide powder which has the function of reducing the electrification property of the red phosphor particles; the blue phosphor particles forming the phosphor layer in each of the blue discharge cells are given either a deposition or a coating of a silicon dioxide powder which has the function of reducing the electrification property of the blue phosphor particles; the green phosphor particles forming the phosphor layer in each of the green discharge cells are given either a deposition or a coating of a powder of one or more selected from the group consisting of aluminum, magnesium and lanthanum which has the function of enhancing the electrification property of the green phosphor particles; the film thickness of the phosphor layer formed in the green discharge cell is thinner than those of the phosphor layer formed in the red discharge cell and the phosphor layer formed in the blue discharge cell.

According to the PDP in the embodiment, the discharge characteristics such as discharge probability and discharge delay in the PDP are improved. This is because a crystalline magnesium oxide layer, which includes magnesium oxide crystals causing a cathode-luminescence emission having a peak within a wavelength range of 200 nm to 300 nm upon excitation by an electron beam, is provided as a protective layer for the dielectric layer.

Further, the adjusting function of approximately synchronizing the timings of the initiation of discharges in the individual discharge cells is imparted to any one phosphor layer of the phosphor layers formed in the red, green and blue discharge cells. Thus, the discharges are initiated approximately coincidently in all the discharge cells, red, green and blue, thereby achieving the display of a pure white color, without it becoming a magenta color.

These and other objects and features of the present invention will become more apparent from the following detailed description with reference to the accompanying drawings.

BRIEF DESCRIPTION OF THE DRAWINGS

FIGS. 14A and 14B are tables showing the comparison of the measured values of the chromaticity coordinates between the case when a coating of silicon dioxide is applied to the red phosphor particles and the case when it is not applied.

FIGS. 15A and 15B are tables showing the comparison of the measured values of brightness between the case when a coating of silicon dioxide is applied to the red phosphor particles and the case when it is not applied.

DETAILED DESCRIPTION OF THE PREFERRED EMBODIMENTS

First Embodiment Example

Figure 1:
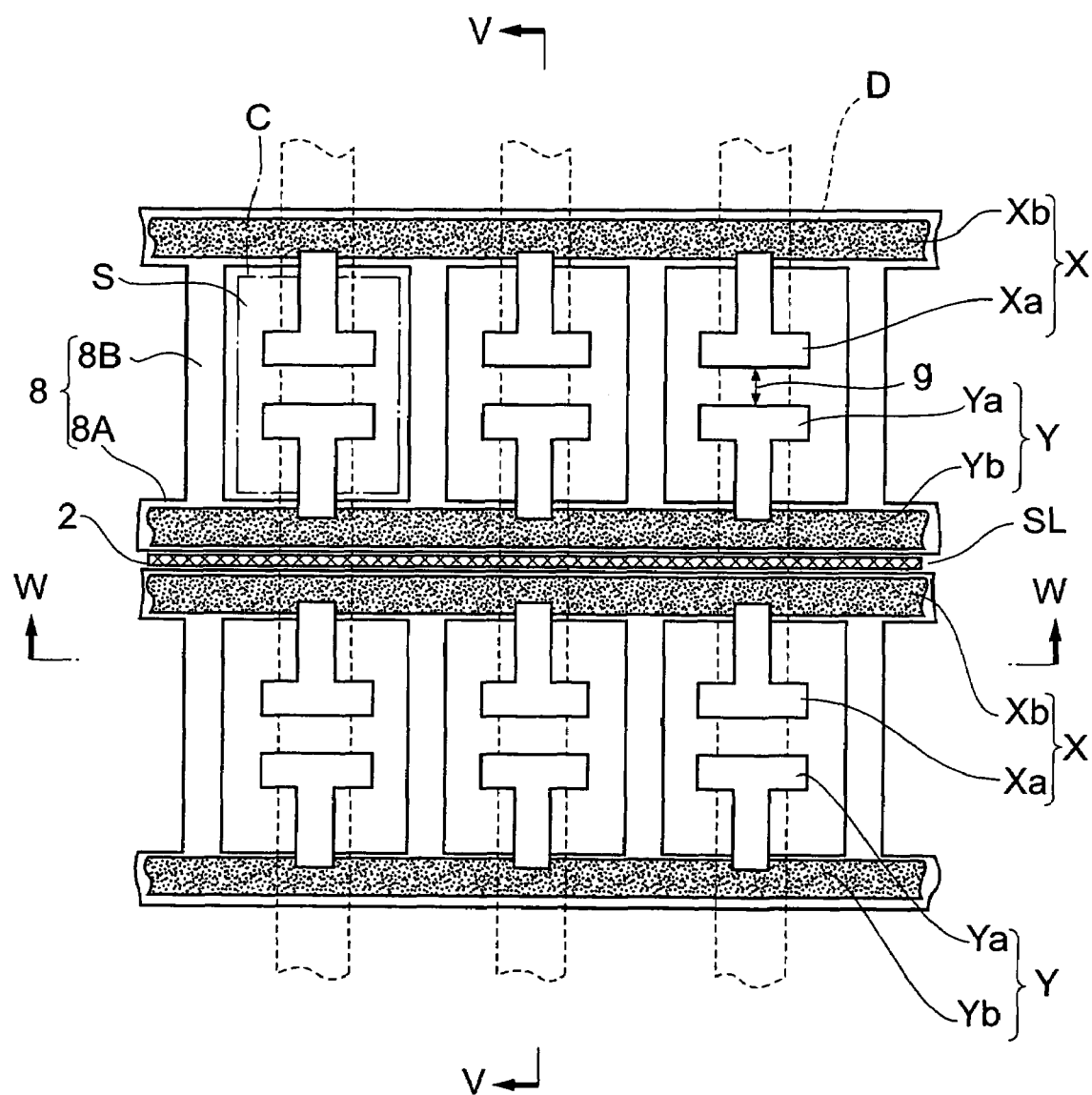
FIG. 1 is a front view illustrating a first example of the embodiment according to the present invention.
Figure 2:
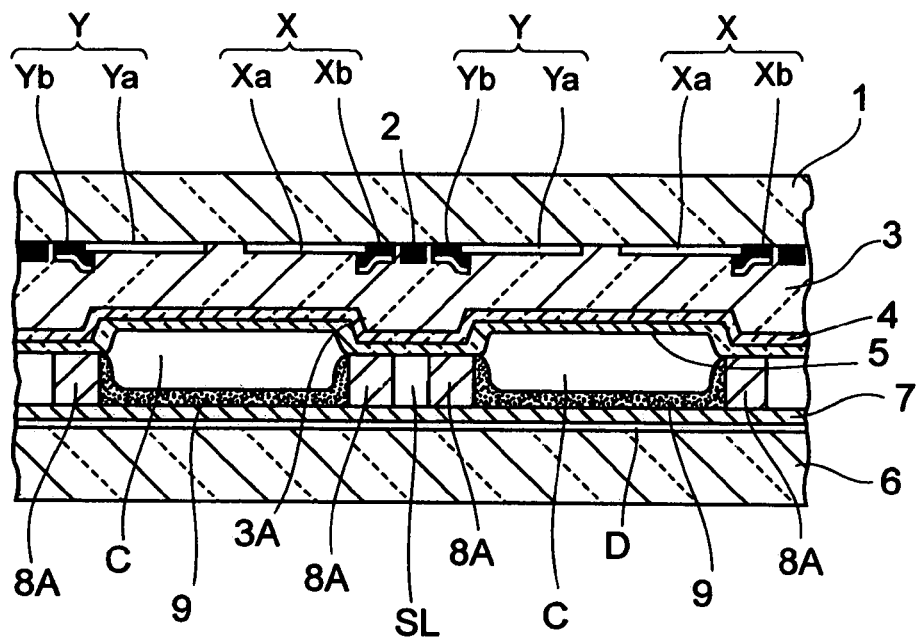
FIG. 2 is a sectional view taken along the V-V line in FIG. 2.
Figure 3:
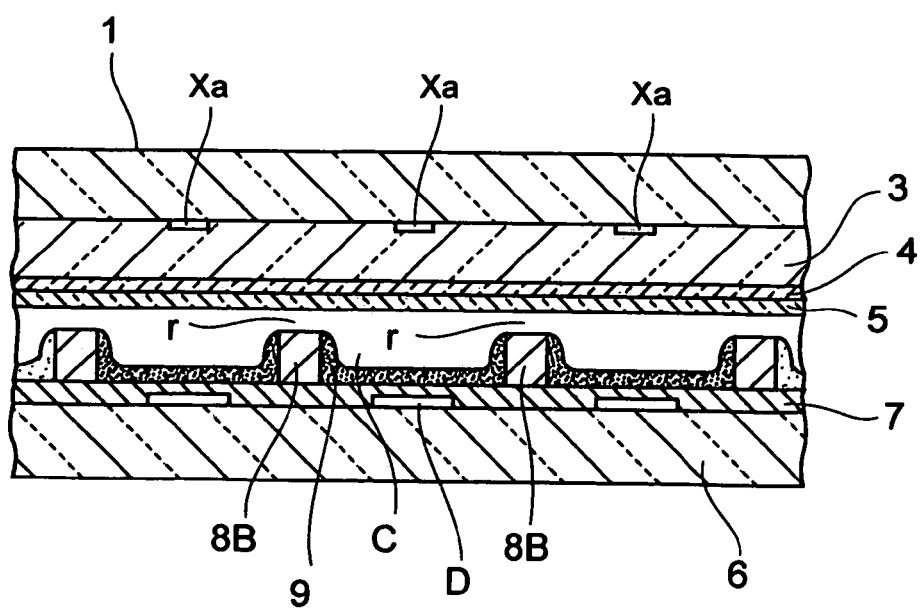
FIG. 3 is a sectional view taken along the W-W line in FIG. 2.

FIGS. 1 to 3 illustrate a first example of the embodiment of the PDP according to the present invention. FIG. 1 is a schematic front view of the PDP in the first embodiment example. FIG. 2 is a sectional view taken along the V-V line in FIG. 1. FIG. 3 is a sectional view taken along the W-W line in FIG. 1.

The PDP in FIGS. 1 to 3 has a plurality of row electrode pairs (X, Y) arranged in parallel on the rear-facing face of a front glass substrate 1 serving as the display surface so as to extend in the row direction of the front glass substrate 1 (the right-left direction in FIG. 1).

A row electrode X is composed of T-shaped transparent electrodes Xa formed of a transparent conductive film made of ITO or the like, and a bus electrode Xb formed of a metal film extending in the row direction of the front glass substrate 1 and connected to the narrow proximal ends of the transparent electrodes Xa.

Likewise, a row electrode Y is composed of T-shaped transparent electrodes Ya formed of a transparent conductive film made of ITO or the like, and a bus electrode Yb formed of a metal film extending in the row direction of the front glass substrate 1 and connected to the narrow proximal ends of the transparent electrodes Ya.

The row electrodes X and Y are arranged in alternate positions in the column direction of the front glass substrate 1 (the vertical direction in FIG. 1). Each of the transparent electrodes Xa and Ya, which are regularly spaced along the associated bus electrodes Xb and Yb facing each other, extends out toward its counterpart in the row electrode pair, so that the wide distal ends of the transparent electrodes Xa and Ya face each other with a discharge gap g having a required width in between.

A black- or dark-colored light absorption layer (light-shield layer) 2, which extends in the row direction along the back-to-back bus electrodes Xb, Yb of the adjacent row electrode pairs (X, Y) in the column direction, is formed between these bus electrodes Xb and Yb on the rear-facing face of the front glass substrate 1.

Further, a dielectric layer 3 is formed on the rear-facing face of the front glass substrate 1 so as to overlie the row electrode pairs (X, Y). On the rear-facing face of the dielectric layer 3, an additional dielectric layer 3A projecting toward the rear from the dielectric layer 3 is formed in a portion facing the back-to-back bus electrodes Xb, Yb of the adjacent row electrode pairs (X, Y) and facing the area between the back-to-back bus electrodes Xb, Yb so as to extend in parallel to these bus electrodes Xb, Yb.

On the rear-facing faces of the dielectric layer 3 and the additional dielectric layers 3A, a magnesium oxide layer 4 of a thin film form (hereinafter referred to as "thin-film MgO layer 4") is formed by vapor deposition or spattering and covers the entire rear-facing faces of the dielectric layer 3 and the additional dielectric layers 3A.

In turn, a magnesium oxide layer 5 including magnesium oxide crystals (hereinafter referred to as "crystalline MgO layer 5"), as described in detail later, is formed on the rear-facing face of the thin-film MgO layer 4. The magnesium oxide crystals cause a cathode-luminescence emission (CL emission) having a peak within a wavelength range of 200 nm to 300 nm (more specifically, of 230 nm to 250 nm, around 235 nm) upon excitation by electron beams.

The crystalline MgO layer 5 is formed on the entire rear-facing face or, for example, a part of the rear-facing face of the thin-film MgO layer 4 that faces discharge cells, which will be described later. (In the example illustrated in FIGS. 1 to 3, the crystalline MgO layer 5 is formed on the entire rear-facing face of the thin-film MgO layer 4.)

The front glass substrate 1 is placed parallel to a back glass substrate 6. Column electrodes D are arranged parallel to each other at predetermined intervals on the front-facing face (the face facing toward the display surface of the PDP) of the back glass substrate 6. Each of the column electrodes D extends in a direction at right angles to the row electrode pairs (X, Y) (i.e. in the column direction) on a portion of the back glass substrate 6 opposite to the paired transparent electrodes Xa and Ya of each row electrode pair (X, Y).

On the front-facing face of the back glass substrate 6, a white column-electrode protective layer (dielectric layer) 7 overlies the column electrodes D, and in turn partition wall units 8 are formed on the column-electrode protective layer 7.

Each of the partition wall units 8 is formed in an approximate ladder shape made up of a pair of transverse walls 8A and vertical walls 8. The pair of transverse walls 8A extends in the row direction in the respective positions opposite to the bus electrodes Xb and Yb of each row electrode pair (X, Y). Each of the vertical walls 8B extends in the column direction between the pair of transverse walls 8 in a mid-position between the adjacent column electrodes D. The partition wall units 8 are regularly arranged in the column direction in such a manner as to form an interstice SL extending in the row direction between the back-to-back transverse walls 8A of the adjacent partition wall sets 8.

The ladder-shaped partition wall units 8 partition the discharge space S defined between the front glass substrate 1 and the back glass substrate 6 into quadrangular areas to form discharge cells C in positions each corresponding to the paired transparent electrodes Xa and Ya of each row electrode pair (X, Y).

A phosphor layer 9 overlies five faces facing the discharge space S: the four side faces of the transverse walls 8A and the vertical walls 8B of the partition wall unit 8 and the face of the column-electrode protective layer 7. The colors of the phosphor layers 9 are arranged such that the three primary colors, red, green and blue, are arranged in order in the row direction for each discharge cell C.

Of the phosphor layers 9, the red phosphor layer 9 is formed of red phosphor particles to which a deposition or coating of a powder of silicon dioxide ($SiO_2$) has been applied.

The crystalline MgO layer 5 (or the thin-film MgO layer 4 when the crystalline MgO layer 5 is formed only on a portion of the rear-facing face of the thin-film MgO layer 4 facing each discharge cell C) overlying the additional dielectric layer 3A (see FIG. 2) is in contact with the front-facing face of each of the transparent walls 8A of the partition wall units 8, to block off the discharge cell C and the interstice SL from each other. However, the crystalline MgO layer 5 is out of contact with the front-facing face of the vertical wall 8B (see FIG. 3), to form a clearance r therebetween, so that the adjacent discharge cells C in the row direction interconnect with each other by means of the clearance r.

The discharge space S is filled with a discharge gas which includes xenon.

For the buildup of the crystalline MgO layer 5, a spraying technique, electrostatic coating technique or the like is used to cause the MgO crystals as described earlier to adhere to the rear-facing face of the thin-film MgO layer 4 overlying the dielectric layer 3 and the additional dielectric layers 3A.

The first embodiment example describes the case where the thin-film MgO layer 4 is formed on the rear-facing faces of the dielectric layer 3 and additional dielectric layer 3A and then the crystalline MgO layer 5 is formed on the rear-facing face of the thin-film MgO layer 4. Alternatively, the crystalline MgO layer 5 may be first formed on the rear-facing faces of the dielectric layer 3 and additional dielectric layers 3A and then the thin-film MgO layer 4 may be formed on the rear-facing face of the crystalline MgO layer 5.

Figure 4:
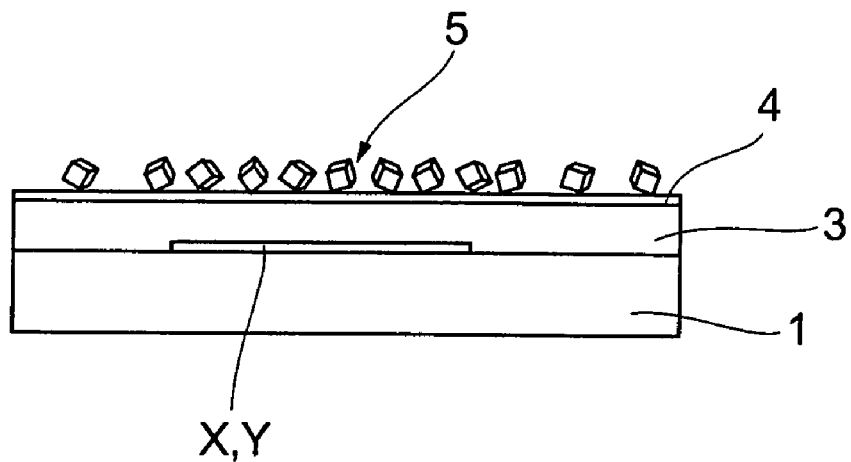
FIG. 4 is a sectional view illustrating a crystalline magnesium oxide layer formed on a thin-film magnesium oxide layer in the first embodiment example.

FIG. 4 shows the state when the thin-film MgO layer 4 is first formed on the rear-facing face of the dielectric layer 3 and then MgO crystals are affixed to the rear-facing face of the thin-film MgO layer 4 to form the crystalline MgO layer 5 by use of a spraying technique, electrostatic coating technique or the like.

Figure 5:
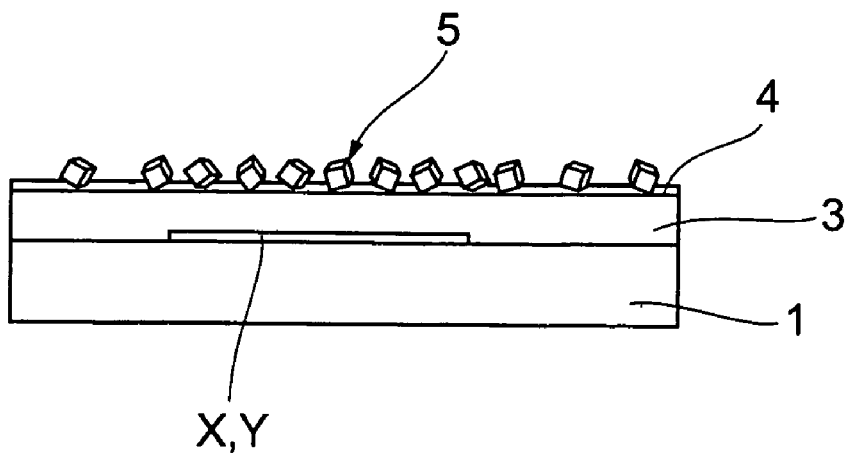
FIG. 5 is a sectional view illustrating a thin-film magnesium oxide layer formed on a crystalline magnesium layer in the first embodiment example.

FIG. 5 shows the state when the MgO crystals are affixed to the rear-facing face of the dielectric layer 3 to form the crystalline MgO layer 5 by use of a spraying technique, electrostatic coating technique or the like, and then the thin-film MgO layer 4 is formed.

The crystalline MgO layer 5 of the PDP is formed by use of the following materials and method.

Figure 6:
FIG. 6 is a SEM photograph of the magnesium oxide single crystals having a cubic single-crystal structure.
Figure 7:
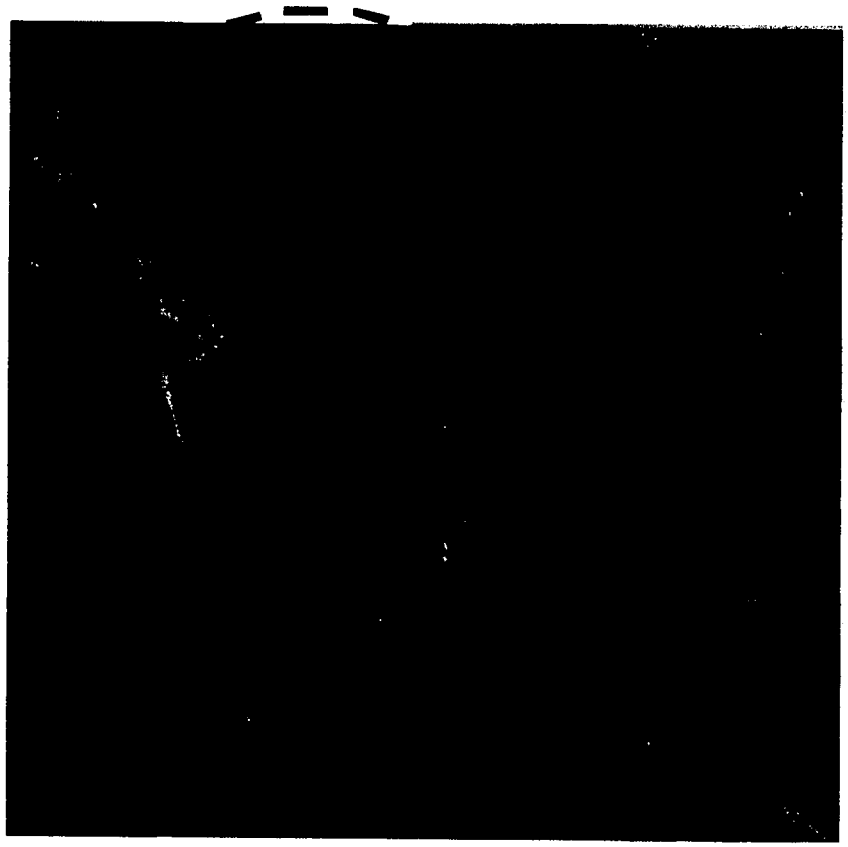
FIG. 7 is a SEM photograph of the magnesium oxide single crystals having a cubic polycrystal structure.

That is to say, examples of MgO crystals, used as materials for forming the crystalline MgO layer 5 and causing a CL emission having a peak within a wavelength range of 200 nm to 300 nm (more specifically, of 230 nm to 250 nm, around 235 nm) by being excited by an electron beam, include single crystals of magnesium which is obtained by performing vapor-phase oxidization on magnesium steam generated by heating magnesium (this single crystals of magnesium are hereinafter referred to as "vapor-phase MgO single crystals"). Examples of the vapor-phase MgO single crystals include MgO single crystals having a cubic single-crystal structure as illustrated in the SEM photograph in FIG. 6, and MgO single crystals having a structure of cubic crystals fitted to each other (i.e. a cubic polycrystal structure) as illustrated in the SEM photograph in FIG. 7.

The vapor-phase MgO single crystals contribute to an improvement of the discharge characteristics such as a reduction in discharge delay as described later.

As compared with magnesium oxide obtained by other methods, the vapor-phase MgO single crystals have the features of being of a high purity, taking a microscopic particle form, causing less particle agglomeration, and the like.

The vapor-phase MgO single crystals used in the first embodiment example has an average particle diameter of 500 or more angstroms (preferably, 2000 or more angstroms) based on a measurement using the BET method.

Note that the preparation of the vapor-phase MgO single crystal is described in "Preparation of magnesia powder using a vapor phase method and its properties" (*Zairyou* (Materials) Vol. 36, No. 410, pp. 1157-1161, November 1987), and the like.

The crystalline MgO layer 5 is formed, for example, by the affixation of the vapor-phase MgO single crystals by use of a spraying technique, electrostatic coating technique or the like as described earlier.

In the above-mentioned PDP, a reset discharge, an address discharge and a sustaining discharge for generating an image are produced in the discharge cell C.

Therefore, when the reset discharge, which is produced before the address discharge, is initiated in the discharge cell C, the priming effect caused by the reset discharge is maintained for a long duration by forming the crystalline MgO layer 5 in the discharge cell C, leading to fast response of the address discharge.

Figure 9:
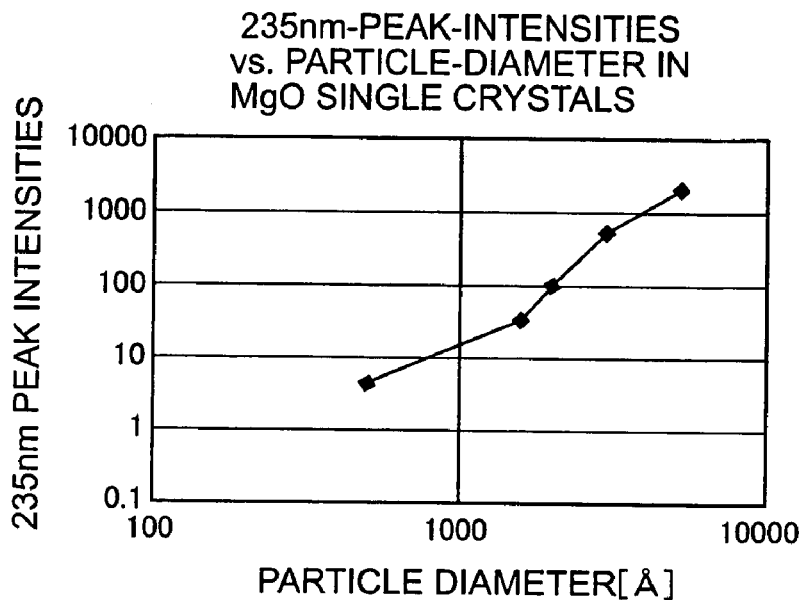
FIG. 9 is a graph showing the relationship between the particle sizes of magnesium oxide single-crystals and the intensities of a CL emission at 235 nm in the first embodiment example.
Figure 10:
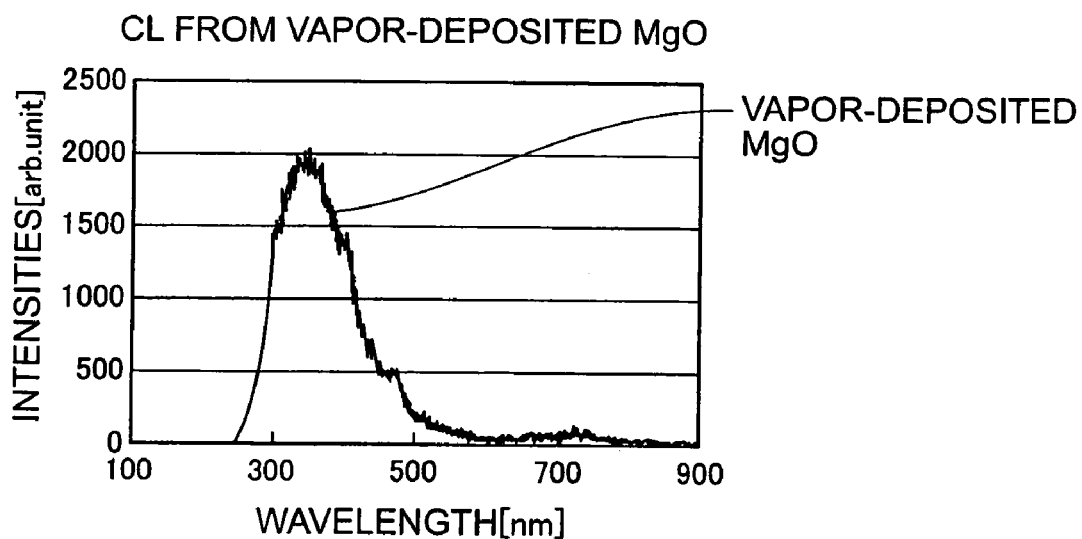
FIG. 10 is a graph showing the state of the wavelength of a CL emission from a magnesium oxide layer formed by vapor deposition.

Because the crystalline MgO layer 5 is formed of the vapor-phase MgO single crystals as described earlier, in the PDP the application of electron beam initiated by the discharge excites a CL emission having a peak within a wavelength range from 200 nm to 300 nm (more specifically, from 230 nm to 250 nm, around 235 nm), in addition to a CL emission having a peak wavelength from 300 nm to 400 nm, from the large-particle-diameter vapor-phase MgO single crystals included in the crystalline MgO layer 5, as shown in FIGS. 9 and 10.

As shown in FIG. 10, the CL emission with a peak wavelength of 235 nm is not excited from a MgO layer formed typically by vapor deposition (the thin-film MgO layer 4 in the first embodiment example), but only a CL emission having a peak wavelength between 300 nm and 400 nm is excited.

Figure 8:
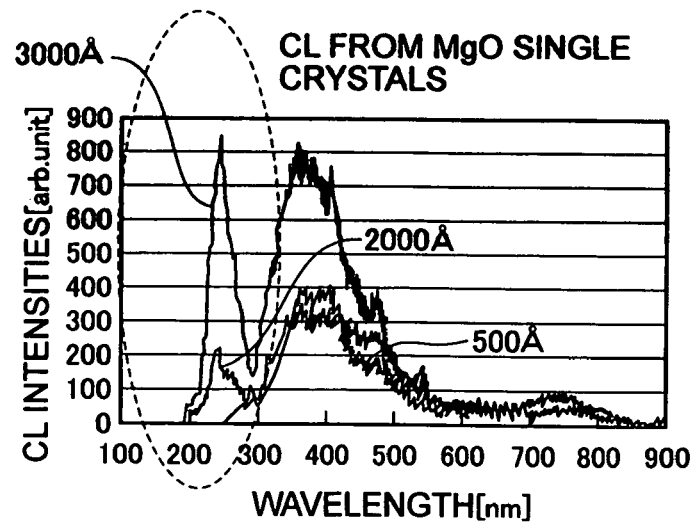
FIG. 8 is a graph showing the relationship between the particle sizes of magnesium oxide single-crystals and the wavelengths of a CL emission in the first embodiment example.

In addition, as seen from FIGS. 8 and 9, the greater the particle diameter of the vapor-phase MgO single crystal, the stronger the peak intensity of the CL emission having a peak within the wavelength range from 200 nm to 300 nm (more specifically, from 230 nm to 250 nm, around 235 nm).

It is conjectured that the presence of the CL emission having the peak wavelength between 200 nm and 300 nm will bring about a further improvement of the discharge characteristics (a reduction in discharge delay, an increase in the discharge probability).

More specifically, the conjectured reason that the crystalline MgO layer 5 causes the improvement of the discharge characteristics is because the vapor-phase MgO single crystals causing the CL emission having a peak within the wavelength range from 200 nm to 300 nm (particularly, from 230 nm to 250 nm, around 235 nm) have an energy level corresponding to the peak wavelength, so that the energy level enables the trapping of electrons for long time (some millisecond. or more), and the trapped electrons are extracted by an electric field so as to serve as the primary electrons required for starting a discharge.

Also, because of the correlationship between the intensity of the CL emission and the particle diameter of the vapor-phase MgO single crystals, the stronger the intensity of the CL emission having a peak within the wavelength range from 200 nm to 300 nm (more specifically, from 230 nm to 250 nm, around 235 nm), the greater the effect of improving the discharge characteristics caused by the vapor-phase MgO single crystal.

In other words, in order to form a vapor-phase MgO single crystal of a large particle diameter, an increase in the heating temperature for generating magnesium vapor is required. Because of this, the length of flame with which magnesium and oxygen react increases, and therefore the temperature difference between the flame and the surrounding ambience increases. Thus, it is conceivable that the larger the particle diameter of the vapor-phase MgO single crystal, the greater the number of energy levels occurring in correspondence with the peak wavelengths (e.g. within a range from 230 nm to 250 nm, around 235 nm) of the CL emission as described earlier.

It is further conjectured that regarding a vapor-phase MgO single crystal of a cubic polycrystal structure, many plane defects occur, and the presence of energy levels arising from these plane defects contributes to an improvement in discharge probability.

The BET specific surface area (s) is measured by a nitrogen adsorption method. From the measured value, the particle diameter ($D_{BET}$) of the vapor-phase MgO single crystals forming the crystalline MgO layer 5 is calculated by the following equation.

$$D_{BET}=A/s\times\rho$$

where

A: shape count (A=6)

$\rho$: real density of magnesium

Figure 11:
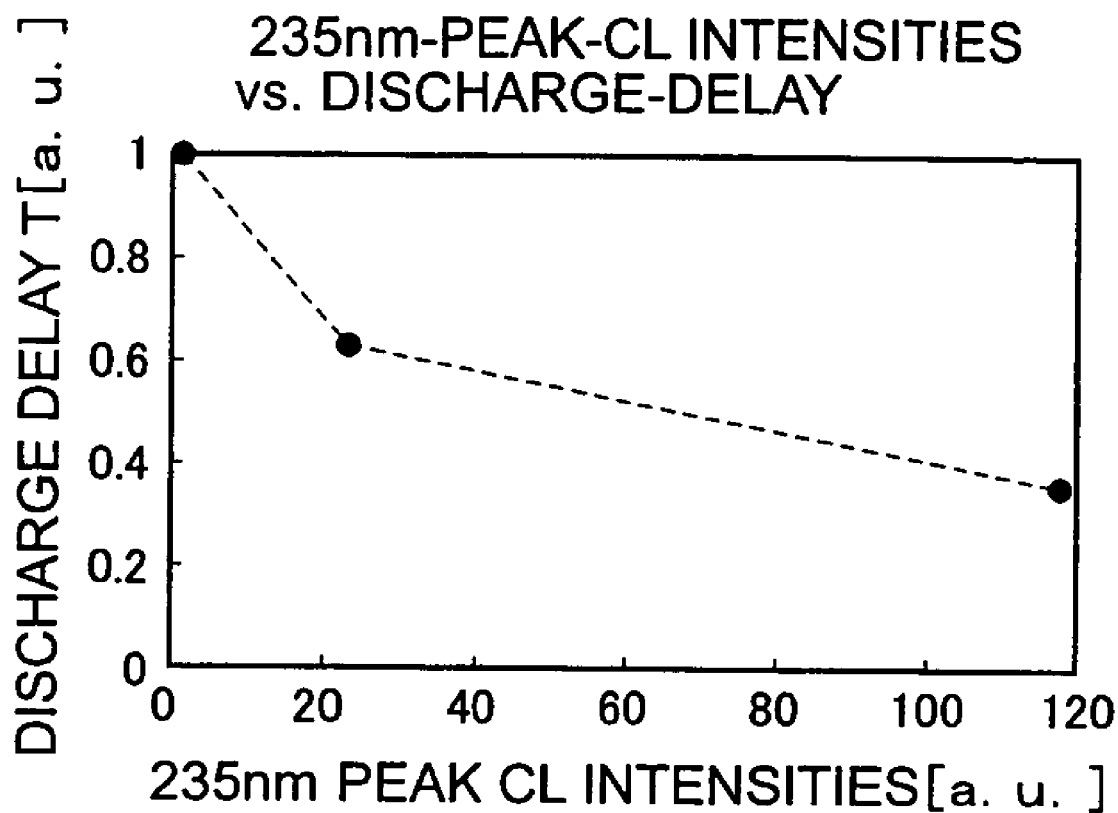
FIG. 11 is a graph showing the relationship between the discharge delay and the peak intensities of a CL emission at 235 nm from the magnesium oxide single crystals.

FIG. 11 is a graph showing the correlatioship between the CL emission intensities and the discharge delay.

It is seen from FIG. 11 that the display delay in the PDP is shortened by the 235-nm CL emission excited from the crystalline MgO layer 5, and further as the intensity of the 235-nm CL emission increases, the discharge delay time is shortened.

Figure 12:
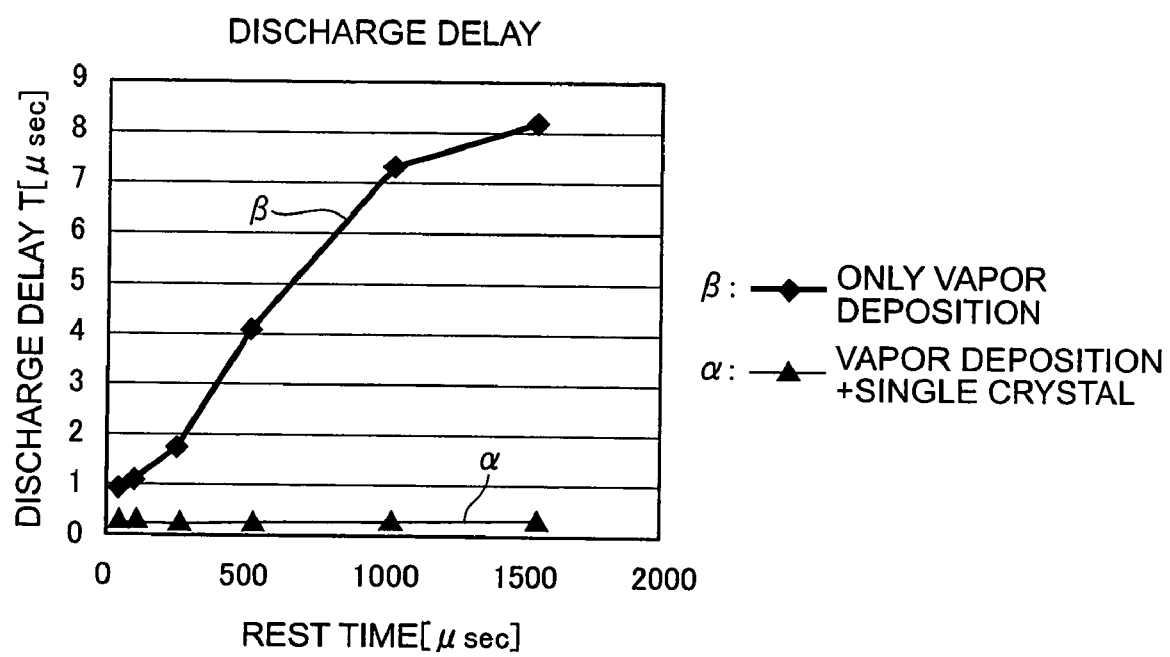
FIG. 12 is a graph showing the comparison of the discharge delay characteristics between the case when the protective layer is constituted only of the magnesium oxide layer formed by vapor deposition and that when the protective layer has a double layer structure made up of a crystalline magnesium layer and a thin-film magnesium layer formed by vapor deposition.

FIG. 12 shows the comparison of the discharge delay characteristics between the case of the PDP having the double-layer structure of the thin-film MgO layer 4 and the crystalline MgO layer 5 as described earlier (Graph a), and the case of a conventional PDP having only an MgO layer formed by vapor deposition (Graph b).

As seen from FIG. 12, the double-layer structure of the thin-film MgO layer 4 and the crystalline MgO layer 5 of the PDP offers a significant improvement in the discharge delay characteristics of the PDP over that of a conventional PDP having only a thin-film MgO layer formed by vapor deposition.

As described hitherto, in addition to the conventional type of the thin-film MgO layer 4 formed by vapor deposition or the like, the crystalline MgO layer 5, which includes the MgO crystals causing a CL emission having a peak within a wavelength range from 200 nm to 300 nm upon excitation by an electron beam, is formed, whereby the aforementioned PDP can be improved in the discharge characteristics such as those relating to the discharge delay, and thus can show satisfactory discharge characteristics.

The MgO crystals used for forming the crystalline MgO layer 5 have an average particle diameter of 500 or more angstroms based on a measurement using the BET method, desirably, of a range from 2000 angstroms to 4000 angstroms.

As described earlier, the crystalline MgO layer 5 is not necessarily required to overlie the entire face of the thin-film MgO layer 4, and may be partially formed by a patterning technique, for example, on a portion of the thin-film MgO layer 4 facing the transparent electrodes Xa and Ya of the row electrodes X and Y or conversely on the portion other than the portion facing the transparent electrodes Xa and Ya.

When the crystalline MgO layer 5 is partially formed, the area ratio of the crystalline MgO layer 5 to the thin-film MgO layer 4 is set at 0.1% to 85%, for example.

The formation of the crystalline MgO layer 5 in the foregoing PDP significantly shortens the discharge delay time and narrows the range of discharge variation as described above. Thus, the timings of the discharges occurring in the discharge cells C of each color are approximately synchronized, so that the amount of voltage drop in a voltage wave form of a sustain pulse is increased. However, for this reason, the differences in the discharge characteristics of the red, green and blue phosphor layers 9 formed in the discharge cells C, cause a slight misalignment of the discharge timings of the address discharges and sustaining discharges occurring in the individual red, green and blue discharge cells C.

More specifically, a higher discharge voltage is required in the discharge cell having the green phosphor layer than those in the discharge cells having the red and blue phosphor layers. The timing of a discharge occurring in the green discharge cell is slightly behind those of the red and blue discharge cells.

For this reason, in spite of the formation of the crystalline MgO layer 5, in the case of the white color display, even when the sustaining discharge is simultaneously initiated in the red, green and blue discharge cells C, the discharge strength in the green discharge cell C is lowered due to the discharge timing lag, resulting in a magenta color display.

The foregoing PDP overcomes this problem associated with the white color display caused by the discharge timing lag in the green display cell C, by means of the application of a deposition or coating of $SiO_2$ powder to the red phosphor particles for forming the red phosphor layer 9.

Figure 13:
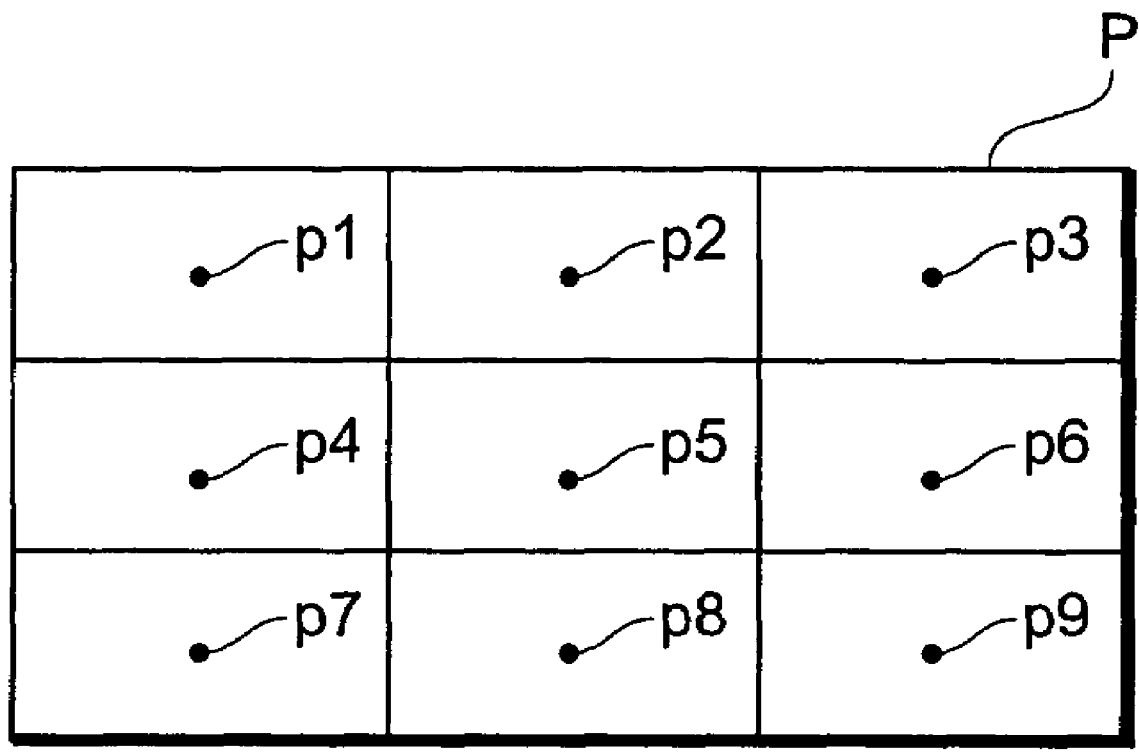
FIG. 13 is an explanatory diagram showing the measurement points of the brightness and the chromaticity coordinates.

In a color PDP equipped with a crystalline MgO layer formed of the phase-phase MgO single crystals, the chromaticity coordinates when the red phosphor layer is formed of red phosphor particles which are given a deposition or coating of $SiO_2$ powder, are compared with the chromaticity coordinates when the red phosphor layer is not formed of the red phosphor particles which are given a deposition or coating of $SiO_2$ powder. These chromaticity coordinates are measured in nine measurement points p1 to p9 on a panel P as shown in FIG. 13. FIGS. 14A and 14B show the comparison of the measured values in the measurement points p1 to p9. FIG. 14A shows the measured values of the chromaticity coordinates when a deposition or a coating of the $SiO_2$ powder is applied to the red phosphor particles forming the red phosphor layer. FIG. 14B shows the measured values of the chromaticity coordinates when a deposition or a coating of the $SiO_2$ powder is not applied to the red phosphor particles.

The chromaticity coordinates of a reference white color based on the NTSC system are:

(x, y)=(0.31, 0.316).

It is seen from the comparison between the tables in FIGS. 14A and 14B that the maximum value of the differences between the measured values in the measurement points p1 to p9 (in-plane difference, x:0.0035, y:0.0093) when a deposition or coating of the $SiO_2$ powder is applied to the red phosphor particles forming the red phosphor layer is significantly smaller than the in-plane difference (x:0.0071, y:0.0118) when a deposition or coating of the $SiO_2$ powder is not applied to the red phosphor particles.

FIGS. 15A and 15B shows the comparison of the measured, in a color PDP equipped with a crystalline MgO layer formed of the phase-phase MgO single crystals, the brightness when the red phosphor layer is formed of red phosphor particles given a deposition or coating of $SiO_2$ powder, and the brightness when the red phosphor layer is not formed of the red phosphor particles given a deposition or coating of $SiO_2$ powder, are measured in nine measurement points p1 to p9 on a panel P as shown in FIG. 13. FIGS. 15A and 15B show the comparison of the measured values of the brightness in the measurement points p1 to p9. FIG. 15A shows the measured values of the brightness when a deposition or a coating of the $SiO_2$ powder is applied to the red phosphor particles forming the red phosphor layer. FIG. 15B shows the measured values of the brightness when a deposition or a coating of the $SiO_2$ powder is not applied to the red phosphor particles.

It is seen from the comparison between the tables in FIGS. 15A and 15B that the maximum value of the differences between the measured values of the brightness in the measurement points p1 to p9 (14.0 cd/m$^2$) when a deposition or coating of the $SiO_2$ powder is applied to the red phosphor particles forming the red phosphor layer is significantly smaller than that (22.2 cd/m$^2$) when a deposition or coating of the $SiO_2$ powder is not applied to the red phosphor particles.

As described above, it is seen from FIGS. 14A, 14B, 15A and 15B that the chromaticity and the chromaticity distribution are both improved in the PDP having the red phosphor layer formed of the red phosphor particles given a deposition or a coating of $SiO_2$ powder.

This is because, in the PDP having the red phosphor layer formed of the red phosphor particles given a deposition or a coating of $SiO_2$ powder, a breakdown voltage for a discharge between the row electrode and the column electrode and a minimum voltage for sustaining a discharge are both increased, so that the electrification property of the red phosphor layer is relatively reduced to cause hard occurrence of a discharge in the red discharge cell. For this reason, the difference of the discharge timings in the red discharge cell and the green discharge cell is reduced. In consequence, the range of variation in discharge strength between the red, green and blue discharge cells is narrowed, leading to an improvement in display characteristics.

The narrowed variation in discharge strength enables display of a pure white color without it becoming a magenta color when a discharge is initiated simultaneously in all the discharge cells, red, green and blue.

The foregoing has described the case where the red phosphor particles forming the red phosphor layer are given a deposition or a coating of a coating material such as a $SiO_2$ powder for causing an increase in the discharge voltage. Alternatively, in addition the red phosphor layer, a blue phosphor layer may be formed of blue phosphor particles given a deposition or a coating of a coating material causing an increase in the discharge voltage such as a $SiO_2$ powder.

By doing so, the difference between the discharge timings in the red, green and blue discharges is more reduced to narrow the range of variation in discharge strength, resulting in display of a clear white color.

The foregoing has described the case where the red phosphor particles or the blue phosphor particles are given a deposition or a coating of a material, such as a $SiO_2$ powder, effecting a change in the electrification property of the red or blue phosphor layer. Alternatively, the material which effects a change in the electrification property, such as $SiO_2$ powder, may be mixed into the red or blue phosphor particles.

Second Embodiment Example

In the PDP described in the first embodiment example, a deposition or a coating of the material which effects a change in the electrification property is applied to, or alternatively the material is mixed into, the red phosphor particles forming the red phosphor layer or the blue phosphor particles forming the blue phosphor layer. By contrast, the PDP according to a second embodiment example has a green phosphor layer formed of green phosphor particles to which a deposition or a coating of a material, such as aluminum, magnesium or lanthanum, producing an enhancement in the electrification property of the green phosphor layer to cause a reduction in the discharge voltage of an address discharge and a sustaining discharge initiated in the discharge cell is applied. Alternatively, the material such as aluminum, magnesium or lanthanum is mixed into the green phosphor particles forming the green phosphor layer.

The structure of the other components in the PDP of the second embodiment example is approximately the same as the structure of the PDP described in the first embodiment example.

A deposition or a coating of the material, such as aluminum, magnesium or lanthanum, producing an enhancement in the electrification property to cause a reduction in the discharge voltage is applied to the green phosphor particles forming the green phosphor layer. Alternatively, the material, such as aluminum, magnesium or lanthanum, is mixed into the green phosphor particles. Thereby, a discharge readily occurs in the green discharge cell relatively to the other discharge cells. In consequence, the difference between in the discharge timing in the green discharge cell and the discharge timings in the red and blue discharges is reduced, resulting in display of a clear white color without it becoming a magenta color.

Third Embodiment Example

Figure 16:
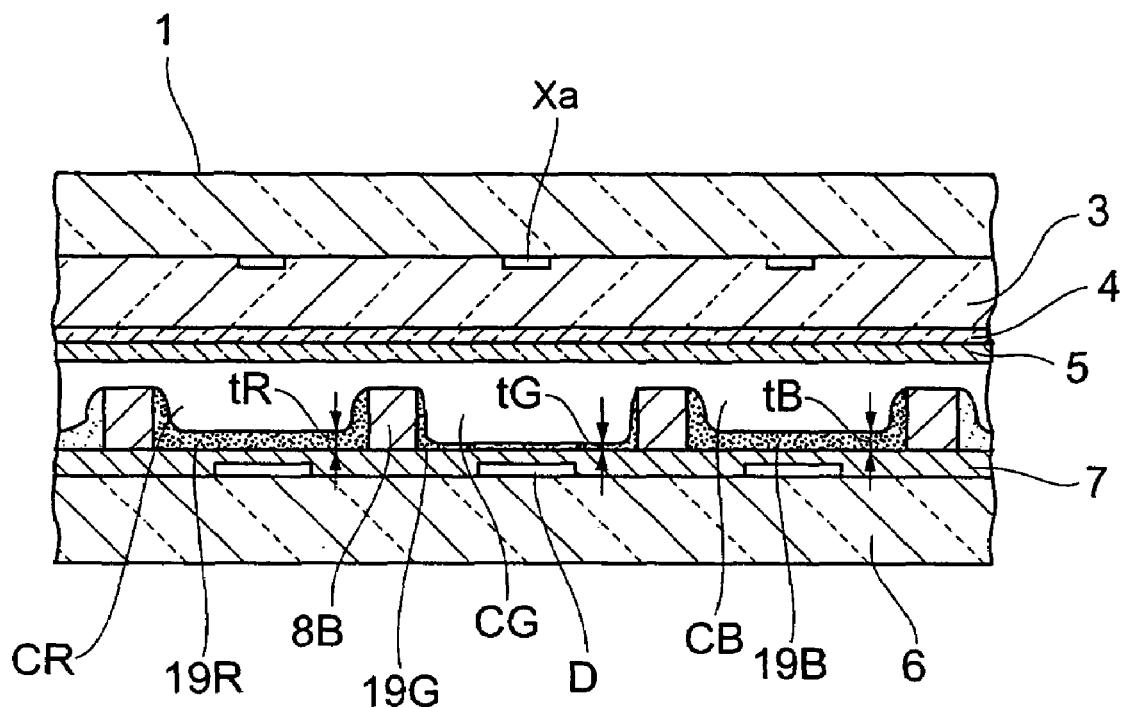
FIG. 16 is a sectional view illustrating a third example of the embodiment according to the present invention.

FIG. 16 is a sectional view illustrating a third example of the embodiment of the PDP according to the present invention, which is taken along the line corresponding to the V-V line in FIG. 1 described in FIG. 1.

In the PDP described in the first embodiment example, a deposition or a coating of the material which effects a change in the electrification property is applied to, or alternatively the material is mixed into, the red phosphor particles forming the red phosphor layer or the blue phosphor particles forming the blue phosphor layer. By contrast, in the PDP according to the third embodiment example, the film thickness of a green phosphor layer is thinner than those of the other red and blue phosphor layers in order for the discharge voltages in the green discharge cell and in the other red and green discharge cells to be roughly equal to each other.

More specifically, in FIG. 16, a phosphor layer 19G in a green discharge cell CG is formed with a film thickness tG that is thinner than a film thickness tR of a phosphor layer 19R in a red discharge CR and also than a film thickness tB of a phosphor layer 19B in a blue discharge cell CB such that a relationship (tG<tR, tG<tB) is established.

The structure of the other components in the PDP of the third embodiment example is approximately the same as that in the PDP of the first embodiment example, and the same structural components as those of the PDP of the first embodiment example are designated by the same reference numerals.

In the PDP, the film thickness tG of the green phosphor layer 19G is thinner than the film thickness tR of the red phosphor layer 19R and also the film thickness tB of the blue phosphor layer 19B, thereby reducing the discharge voltage of the address discharge and the sustaining voltage initiated in the green discharge cell CG. Because of this, a discharge readily occurs in the green discharge cell CG relatively to the red discharge cell CR and the blue discharge cell CB, so that the difference in the discharge timing between the green discharge cell CG and the red and blue discharge cells CR and CB is reduced.

Thus, when the sustaining discharge is initiated simultaneously in all the discharge cells CR, CG and CB in order to display a white color, the display of a pure white color is achieved without it becoming a magenta color.

The terms and description used herein are set forth by way of illustration only and are not meant as limitations. Those skilled in the art will recognize that numerous variations are possible within the spirit and scope of the invention as defined in the following claims.

What is claimed is:

1. A plasma display panel, which is equipped with a front substrate and a back substrate placed opposite each other on either side of a discharge space, a plurality of row electrode pairs provided between the front and back substrates, and column electrodes extending in a direction at right angles to the row electrode pairs between the front and back substrates and forming unit light emission areas respectively corresponding to intersections with the row electrode pairs in the discharge space, the unit light emission areas being divided into three types, red unit light emission areas in which red phosphor layers are formed, green unit light emission areas in which green phosphor layers are formed and blue unit light emission areas in which blue phosphor layers are formed, a discharge being initiated in each of the unit light emission areas by applying voltage between the row electrodes constituting each row electrode pair or between the column electrode and the row electrode, the plasma display panel comprising a crystalline magnesium oxide layer that includes magnesium oxide crystals capable of emitting a cathode-luminescence emission having a peak within a wavelength range of 200 nm to 300 nm, and is provided between the front substrate and the back substrate, facing the red unit light emission areas, the green unit light emission areas and the blue unit light emission areas, wherein any one of the phosphor layers of the red, green and blue colors has a material capable of effecting a change in an electrification property of the phosphor layer for giving rise to an approximate match between a timing of a discharge initiated in the green unit light emission area and a timing of either a discharge initiated in the red unit light emission area or that initiated in the blue unit light emission area.

2. A plasma display panel according to claim 1, wherein the material capable of effecting a change in the electrification property in the red phosphor layer is silicon dioxide.

3. A plasma display panel according to claim 2, wherein the red phosphor layer is formed of red phosphor particles given either a deposition or a coating of a powder of the silicon dioxide.

4. A plasma display panel according to claim 1, wherein the material capable of effecting a change in the electrification property in the blue phosphor layer is silicon dioxide.

5. A plasma display panel according to claim 4, wherein the blue phosphor layer is formed of blue phosphor particles given either a deposition or a coating of a powder of the silicon dioxide.

6. A plasma display panel according to claim 1, wherein the material capable of effecting a change in the electrification property in the green phosphor layer is a material of one or more selected from the group consisting of aluminum, magnesium and lanthanum.

7. A plasma display panel according to claim 6, wherein the green phosphor layer is formed of green phosphor particles given either a deposition or a coating of a power of a material of one or more selected from the group consisting of aluminum, magnesium and lanthanum.

8. A plasma display panel, which is equipped with a front substrate and a back substrate placed opposite each other on either side of a discharge space, a plurality of row electrode pairs provided between the front and back substrates, and column electrodes extending in a direction at right angles to the row electrode pairs between the front and back substrates and forming unit light emission areas respectively corresponding to intersections with the row electrode pairs in the discharge space, the unit light emission areas being divided into three types, red unit light emission areas in which red phosphor layers are formed, green unit light emission areas in which green phosphor layers are formed and blue unit light emission areas in which blue phosphor layers are formed, a discharge being initiated in each of the unit light emission areas by applying voltage between the row electrodes constituting each row electrode pair or between the column electrode and the row electrode, the plasma display panel comprising:

a crystalline magnesium oxide layer that includes maanesium oxide crystals capable of emitting a cathode-luminescence emission having a peak within a wavelength range of 20 nm to 300 nm, and is provided between the front substrate and the back substrate, facing the red unit light emission areas, the green unit light emission areas and the blue unit light emission areas, wherein the green phosphor layer has a film thickness which is thinner than a film thickness of either the red phosphor layer or the blue phosphor layer.

9. A plasma display panel according to claim 1, wherein the magnesium oxide crystals are magnesium oxide single crystals produced by use of vapor-phase oxidization.

10. A plasma display panel according to claim 1, wherein the magnesium oxide crystals cause a cathode-luminescence emission having a peak within a range from 230 nm to 250 nm.

11. A plasma display panel according to claim 1, wherein the magnesium oxide crystals include magnesium oxide crystals having a particle diameter of 2000 or more angstroms.

12. A plasma display panel according to claim 1, wherein the row electrode pairs are overlain by a dielectric layer formed on the front substrate, and the crystalline magnesium oxide layer is formed on a face of the dielectric layer facing toward the unit light emission areas.

13. A plasma display panel according to claim 1, further comprising a partition wall unit provided between the front substrate and the back substrate for partitioning the discharge space into the unit light emission areas, wherein the column electrodes are formed on the back substrate and overlain by a dielectric layer, and each of the phosphor layers of the red, green and blue colors is formed on side faces of the partition wall unit and the dielectric layer overlying the column electrodes.

14. A plasma display panel according to claim 1, wherein the crystalline magnesium oxide layer is laminated on a thin-film magnesium oxide layer formed by either vapor deposition or spattering.

15. A plasma display panel according to claim 14, wherein the row electrode pairs are overlain by a dielectric layer formed on the front substrate, the thin-film magnesium oxide layer is formed on the dielectric layer, and in turn the crystalline magnesium oxide layer is formed on the thin-film magnesium oxide layer by spraying the magnesium oxide crystals.

* * * * *